United States Patent [15] 3,706,855

Pitroda et al. [45] Dec. 19, 1972

[54] GENERATOR FOR DIGITAL PULSE SIGNALS REPRESENTATIVE OF ANALOG SIGNAL PAIRS

[72] Inventors: Satyan G. Pitroda, Villa Park, Ill.; Bernard J. Rekiere, Addison, Ill.

[73] Assignee: GTE Automatic Electric Laboratories Incorporated, Northlake, Ill.

[22] Filed: Oct. 2, 1970

[21] Appl. No.: 77,487

[52] U.S. Cl. ...........................179/18 ES, 179/15 BY

[51] Int. Cl. ...............................................H04g 3/12

[58] Field of Search ..179/15 BY, 18 J, 18 ES, 15 AT

[56] References Cited

UNITED STATES PATENTS 3,435,149 3/1969 Inose et al.......................179/15 BY 3,588,366 6/1971 Formenti et al.................179/15 BY 3,524,946 8/1970 Pinet et al...........................179/18 J

*Primary Examiner*—T. W. Brown

*Attorney*—Cyril A. Krenzer, K. Mullerheim, B. E. Franz and Robert J. Black

[57] ABSTRACT

A technique of multifrequency pulsing consisting of transmitting a digitally valid number over pulse code modulated carrier from a time division multiplex office. The signals generated thereby after passing through a conventional carrier channel bank would be accepted by conventional analog multifrequency receivers as utilized in the telephone industry.

3 Claims, 7 Drawing Figures

PATENTED DEC 19 1972

3,706,855

INVENTORS
SATYAN G. PITRODA
BERNARD J. REKIERE
BY [signature]
AGENT

GENERATOR FOR DIGITAL PULSE SIGNALS REPRESENTATIVE OF ANALOG SIGNAL PAIRS

BACKGROUND OF THE INVENTION

This invention relates generally to signaling techniques in telephone communication systems and more particularly to the generation of digital code signals that are the equivalent of conventional analog multifrequency tone signals.

At the present time the utilization of multifrequency pulsing for signaling in telephone systems has become quite common. The present analog multifrequency pulsing system utilizes various combinations of two-out-of-six basic tone frequencies in the voice band. The six tone frequencies are from the 700 Hz. to 1,700 Hz. spaced 200 Hz. apart. These six frequencies provide 15 possible two-tone or two-frequency combinations. Each combination represents a tone pair which at the receiver end is interpreted as a transmitted digit. Obviously 10 combinations are used for the digits 0 through 9 inclusive and two additional are used to indicate the beginning (KP) and the stop (ST) signals. The remaining three combinations are or may be used for special signals. Inasmuch as the signals generated are within the voice frequency range, the information generated in this manner is sent over the regular talking channel.

From the above it is obvious that in a conventional or tandem central office some form must be utilized for converting the analog tone signals into digital pulses for controlling the switching equipment. In the usual arrangement at the central office the digit or dialing signals, the end of dialing and party identification signals after amplification and amplitude limitation are separated or selected by means of tone circuits. The signals are then utilized to operate in registering relays.

Now however for the pulse code modulated office which would employ primary digital circuits it would be desirable to have digital tone generators to avoid sampling and then quantizing the analog signals. The problem involved here is to design tone generators for a pulse code modulated office which would be accepted after passing through a channel bank, by any other analog multifrequency receiver existing in a connected office. At the present pulse code modulated time division multiplex offices do not exist. However for interoffice signaling on a pulse code modulated carrier the method described herein might be employed.

The significant increase in the utilization of pulse code modulation as a transmission technique for reducing costs by permitting a multiplicity of conversations to be transmitted over a single cable pair has become increasingly well-known. Translation of an analog signal into pulse code modulation normally begins by switching sequentially from one channel to another at a rapid rate, each channel occupying the transmission line for a fraction of the total time. Conversations are thus stacked in time rather than in frequency as in conventional frequency division multiplex carrier systems. This method is referred to as time division multiplexing. By synchronizing the sampling rate at the receive end each channel may be recreated in its original form. If periodic samples of the waveform are taken often enough the waveform can be perfectly reconstructed at the terminal. The necessary sampling rate is usually twice that of the highest frequency to be transmitted. Therefore if 4,000 Hz. is the highest frequency on a telephone channel, samples taken at the rate of 8,000 Hz. will precisely and exactly duplicate the telephone conversation.

Even though pulse code modulated time division multiplex offices do not exist at the present time interoffice signaling over pulse code modulated carrier can be employed. The indicated technique based on the current state of the art would be for an analog multifrequency pulse to be generated and then sampled at the rate of 8 kHz. (in a manner similar to that of sampling of voice signals) and then quantized. At the distant office or receiver end the pulse code modulated signal would then be decoded into the original pulse amplitude modulated samples. These same pulse amplitude modulated samples would then be filtered resulting in an analog signal that will be passed on to the tone detectors referred to above for identification. Obviously this technique requires considerable hardware.

SUMMARY OF THE INVENTION

Applicants' recognition of the deficiencies of analog signal conversion for interoffice signaling in a pulse code modulated transmission system, results in the signaling technique set forth in the present invention which reduces the amount of equipment required to originate pulse code modulated transmission of multifrequency tone pairs.

The technique suggested is to store in a non-destructive read-out memory, blocks of 7-bit words for each tone pair. Each 7-bit word is the pulse code modulated code of a pulse amplitude modulated sample. Since pulse code modulated carrier employs compression techniques in encoding and decoding, the 7-bit word is a compressed coded pulse amplitude modulated sample. When a particular tone pair is required for transmission the corresponding block is cyclically read. The stored information is then transmitted. Such a non-destructive read-out memory would be common to a group of code transmitters employed in the switching system.

Such a technique results in the production of tone signals that are generated in the form which are directly suitable for utilization in pulse code modulated transmission. The transmitted frequency exhibits no changes in frequency over a protracted period of time and the phase difference between the two basic frequencies of a tone pair is always constant; that is to say, they are in phase. Economically the suggested system exhibits considerable advantage because of its lack of analog circuits. Additional advantages of the present system are predicated on the fact that only one tone generator is required for the entire office and that this generator may be time shared. Thus the tone generator becomes economically very attractive as the number of senders employed in a particular office increase.

DESCRIPTION OF THE DRAWINGS

The nature of the present invention and a better understanding of its operation will be had in the following detailed description taken in conjunction with the accompanying drawings in which.

DESCRIPTION OF THE PREFERRED EMBODIMENT

Figure 1:
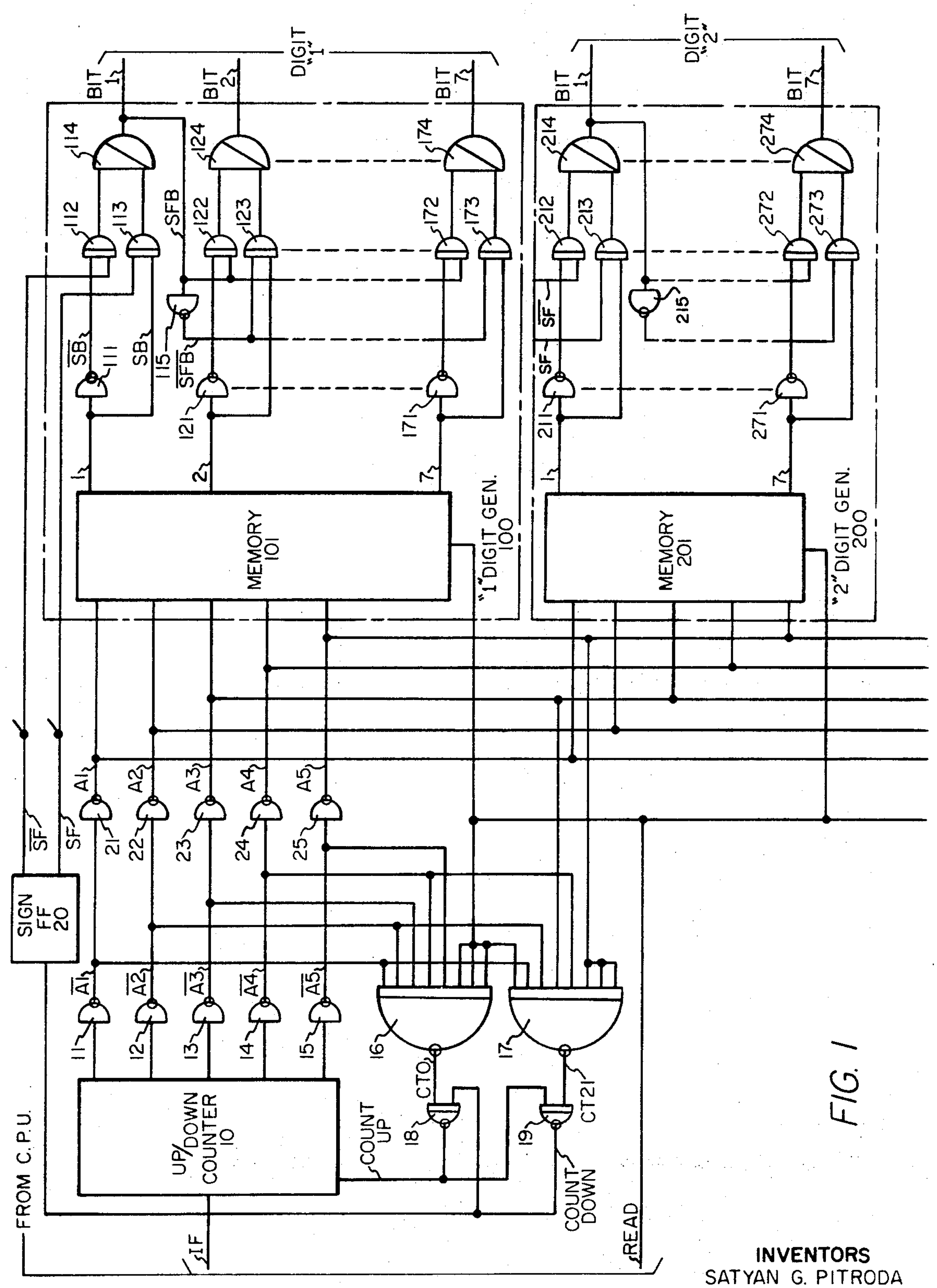
FIGS. 1 and 2 in combination comprise a functional diagram of a tone signaling generation system for use in a pulse code modulated transmission communication system.

As was noted previously the transmission of tone in signaling systems as described must be for a period of at least 35 milliseconds. This period is required in order that the signals be accepted and identified by a receiver at the distant end. Based on this arrangement at a sampling rate of 8 kHz. we will have one pulse amplitude modulated sample every 125 microseconds. To transmit for 35 milliseconds we will need to store 280 samples. This then requires 2,240 bits in the non-destructive read-out memory for a single tone. Inasmuch as 12 tones are employed the size of the memory employed would seem to render the system economically unattractive.

Figure 3:
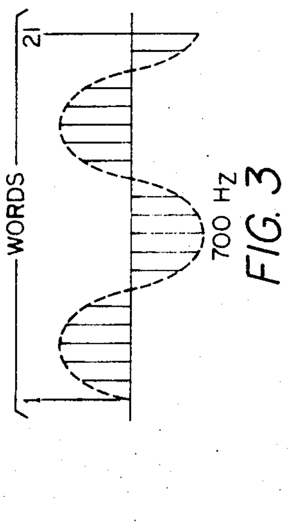
FIG. 3 is the analog waveform indicated when a pulse amplitude modulated sample of a 700 Hz. signal is taken for a period of 2.5 milliseconds (sampled at an 8 kHz. rate).
Figure 4:
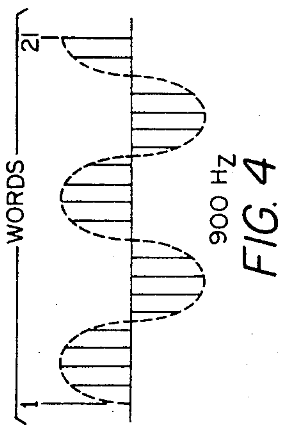
FIG. 4 is an analog waveform of the pulse amplitude modulated sample of 900 Hz. for 2.5 milliseconds (sampled at an 8 kHz. rate).
Figure 5:
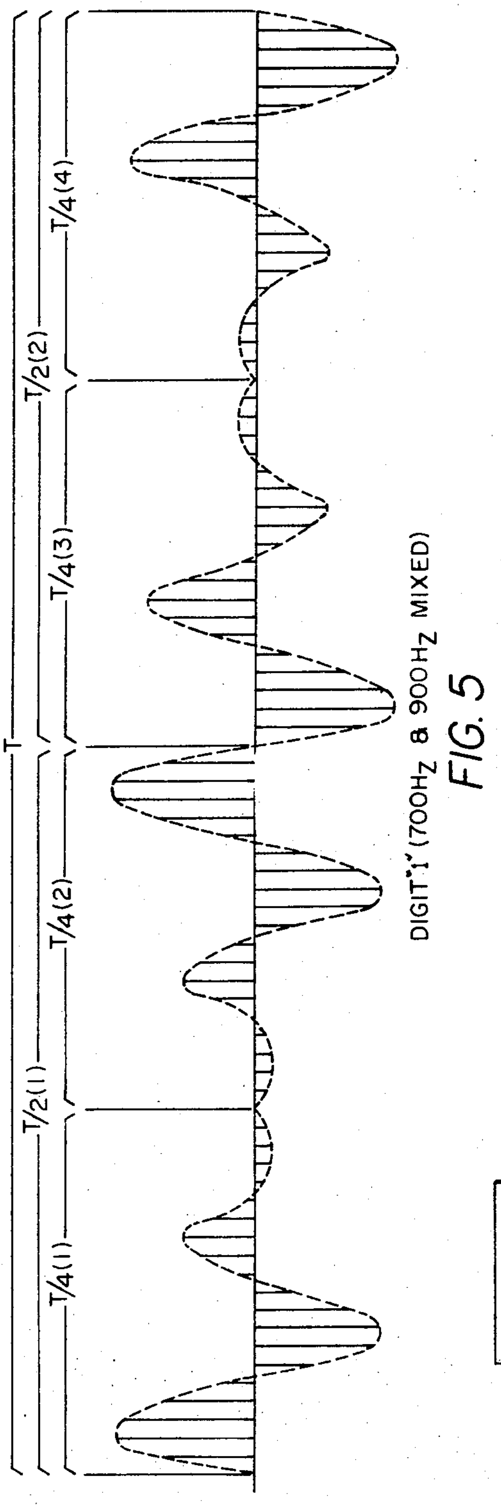
FIG. 5 shows the analog waveform required to transmit the digit "1" for a period of 10 milliseconds.
Figure 7:
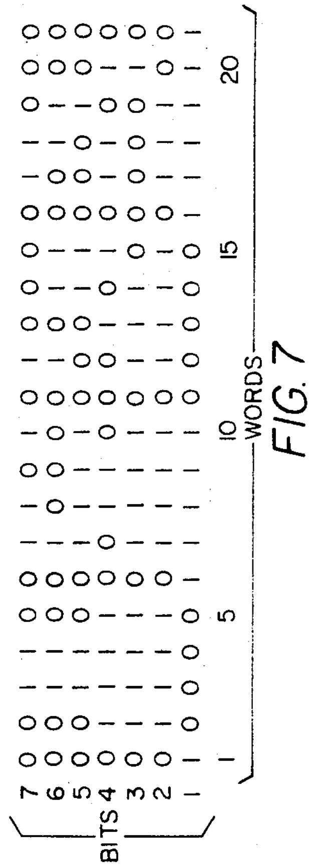
FIG. 7 is a table showing the coding of 21, 7-bit binary words for the compressed pulse amplitude modulated sample, required to produce the digit "1."

Fortunately all fifteen combinations of two frequencies employed in high frequency tone signaling have a common period of 10 milliseconds. Knowing this we need to store only 80 samples instead of the 220 indicated and read it cyclically. FIG. 5 shows the analog waveform required to transmit the digit 1. Above this are shown in FIGS. 3 and 4 pulse amplitude modulated samples of 700 Hz and 900 Hz. each for period of 2.5 milliseconds (samples at an 8 kHz. rate). FIG. 5 is the resulting linearly mixed analog wave based on FIGS. 3 and 4 for a period of 10 milliseconds. FIG. 7 shows the binary equivalent of the compressed pulse amplitude modulated sample.

The binary equivalents of compressed pulse amplitude modulated sample of all tones normally employed in telephone signaling were obtained by means of computer synthesis. The computer was asked to plot the compressed and uncompressed analog signals of all fifteen combinations. From the plots obtained by computer simulation it was observed that the linearly mixed waveforms are periodic and symmetric. The period indicated above of 10 milliseconds corresponds to exactly 80 samples. The waveform symmetry is such that all even quarter periods such as T/4 (2) and T/4 (4) are the mirror images of the corresponding odd quarter periods T/4 (1) and T/4 (3) respectively. And every half period T/2 (1) the waveform is inverted as shown in FIG. 5 [T/2 (2)].

This observation means that instead of storing for the entire period T which requires 80 sample stores, it is possible to generate the same waveform by storing for just the quarter period T/4 which requires only 20 sample stores. The technique as suggested here is to store only 21 samples, and read in a fashion as to form the entire waveform from this. The encoding logic consisting of gates 112, 113 and 114 associated with bit "1" of digit 1, 122, 123, 124 associated with bit "2" of digit 1, etc. is shown in FIG. 1. This logic provides the format for pulse code modulation transmission as employed in present PCM carrier systems where conventionally zero is represented by a particular level with each other digit represented by a different specific amplitude level. The amplitude transmitted for a positive sample corresponds to the exact word stored in a memory such as 101. The amplitude information for the negative sample corresponds to the complement of the word representing the amplitude. This technique therefore provides all the basic functions with a minimum of storage requirements.

Figure 2:
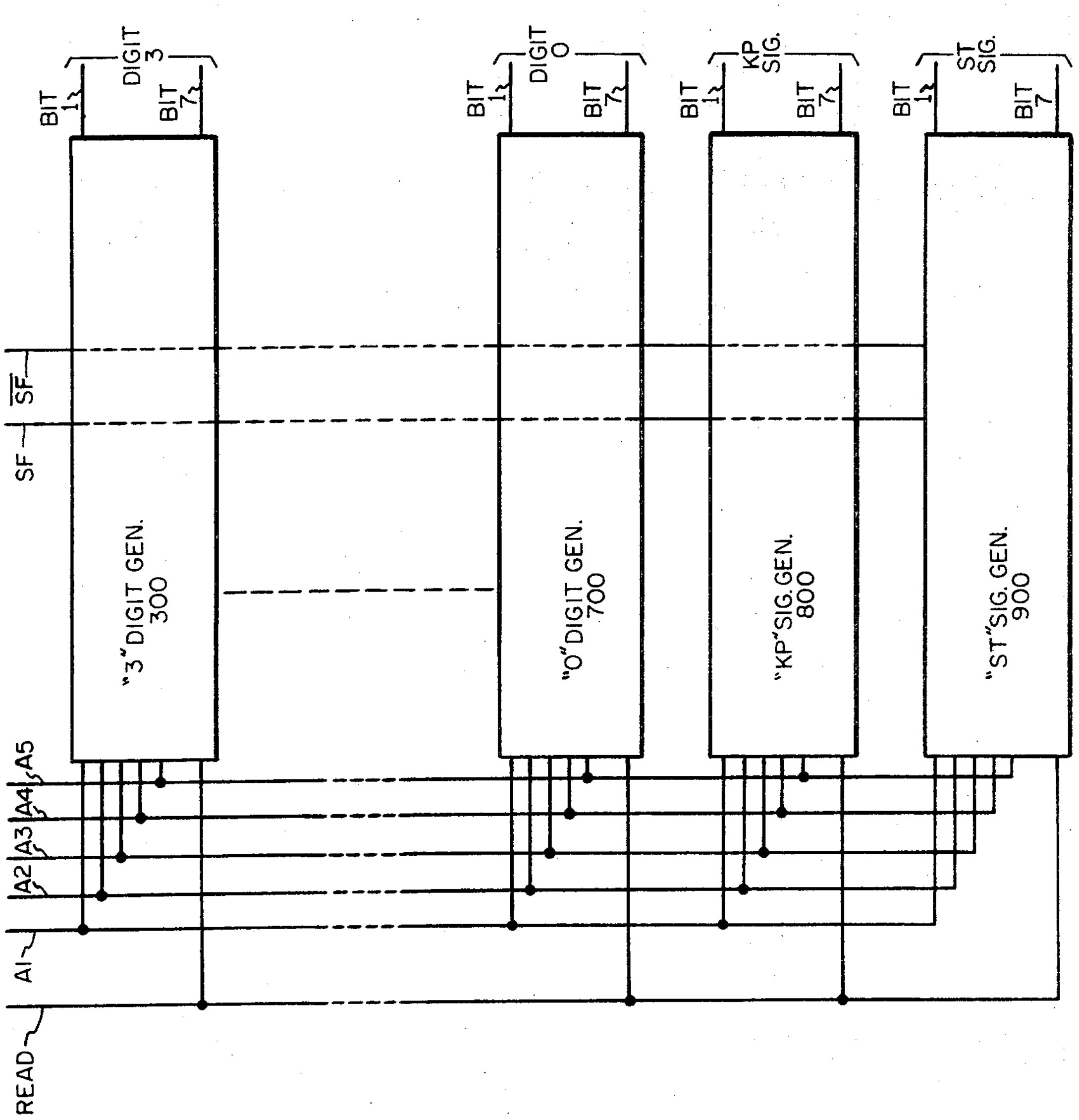
Figure 6:
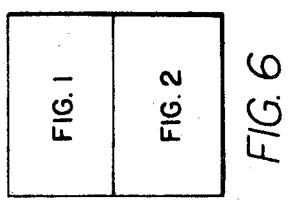
FIG. 6 shows the manner in which FIGS. 1 and 2 should be arranged in combination for the best understanding of the present invention.

Referring now to FIGS. 1 and 2 taken in combination as shown in FIG. 6 the detailed circuit operation of the present system will be discussed.

Shown in FIGS. 1 and 2 are digit generators 100, 200, 300, 700, 800 and 900; each of these covers the specific circuitry associated with generation of the digits 1, 2, 3, 0, KP signal and ST signal respectively. Digits generators 4 through 9 inclusive are not shown. As shown in digit generators 100 and 200 each digit generator includes a 21 word 7-bit memory for the digits to be produced by the particular digit generator. One word is cyclically read from each memory every 125 microseconds. Initially a framing pulse from a central processing unit is received at the "up-down" counter 10. The "up-down" counter 10 then produces a count of 1 and the first word is read out from all memories. During this time because of the count up condition of the "up-down" flip-flop consisting of gates 18 and 19, the "up-down" counter 10 is counting in the upward direction. Thus the second framing pulse in the "up-down" counter 10 from the central processing unit counts 2 and the second word is read out of the memories. "Up-down" counter 10 counts a maximum of 21 frames which corresponds to a quarter period (see FIG. 5). A 21st sample corresponds to the end point and is similar to the first sample representing the zero level.

The 22nd framing pulse received at the IF input of the "up-down" counter 10 sets the "up-down" flip-flop to count down and the counter then starts counting down so that from the memory the 20th word is then read out. The counter then continues to count all the way back down to 1 (corresponding to another quarter period). At this time the information of all the samples in a so-called half period (T/2) has been read.

During the next framing pulse the "up-down" flip-flop consisting of gates 18 and 19 returns to the count up state and the counter 10 proceeds to count up. During this half period the analog waveform as indicated in FIG. 5 is the inverse of the first half period. This requires that the first bit of every word which represents the sign should be changed to its complement during this half period. The "sign" flip-flop 20 and the complement circuits will provide this required function. As may be observed the "sign" flip-flop 20 outputs are connected to gates 113 and 112 to determine whether the output signal for each bit is of the original polarity or the complement thereto associated with bit 1. Subsequent operations are controlled by the output of bit 1 from digit 1 either directly to gates such as 122 associated with bit 2, 172 associated with bit 7, etc. of digit 1, or through inverter 115 which has its output connected to gates such as 123, 173, etc.

The process outlined above continues cyclically with each and every framing pulse.

It should be noted that the seven bits representing the amplitude of a particular sample stored in the form of a binary word are identical from quarter period to quarter period but the sign bit is complemented or reversed every half period. The information is thus read out of the memory through the indicated gating circuit with the information available on a 12×7 bus structure for the entire frame period. Digital representations of the digits 1 through 0 inclusive as well as KP and ST signals are available, and by means of gating circuitry are applied to the telephone system as required. The necessary timing required to transmit tones is built into the central processing unit and in association with the aforementioned switching equipment will determine the utilization and duration of output signals derived from the present invention. The address to which the tone digit is to be sent out to, is also provided from the central processing unit.

What is claimed is:

1. Means for generating a plurality of different digital signals, each representative of a different analog tone signal pair, for use in signaling in a telephone system, comprising: common equipment, including counting means having a circuit connection to said telephone system central processing unit, operated in response to receipt of pulses from said central processing unit to count sequentially in a first direction to produce a numerical sequence of output pulses; a plurality of digital tone generators each connected to said common equipment and each including a non-destructive readout memory having circuit connections to said counting means and to said central processing unit, each operated in response to a specific particular count produced by said counting means in combination with a signal from said central processing unit, to produce a digital readout signal representative of a particular tone signal pair corresponding to a particular signal used in a telephone system; and said digital signal generators each further including a plurality of gating circuits connected to said memories operated to control the digital signal outputs of said memories.

2. Apparatus as claimed in claim 1 wherein: said counting means comprise a bidirectional counter and wherein said common equipment further includes directional control means connected to said bidirectional counting means, operated in response to receipt of a particular count from said counting means, to condition said counting means to reverse the direction of count from said first direction.

3. Apparatus as claimed in claim 1 wherein: said common equipment further includes polarity control means including circuit connections to said directional control means and to said gating means, operated in response to said directional control means to reverse the polarity of signals transmitted from said memories.

* * * * *